(12) United States Patent
Fordham

(10) Patent No.: US 7,680,860 B1
(45) Date of Patent: Mar. 16, 2010

(54) METHOD AND SYSTEM FOR CREATING VERTICAL SEARCH ENGINES

(75) Inventor: Matthew A. Fordham, Chicago, IL (US)

(73) Assignee: LOGIKA Corporation, Chicago, IL (US)

( * ) Notice: Subject to any disclaimer, the term of this patent is extended or adjusted under 35 U.S.C. 154(b) by 1118 days.

(21) Appl. No.: 10/797,857

(22) Filed: Mar. 10, 2004

Related U.S. Application Data

(62) Division of application No. 09/918,838, filed on Jul. 31, 2001, now Pat. No. 6,714,934.

(51) Int. Cl.
*G06F 7/00* (2006.01)

(52) U.S. Cl. .................................. 707/741; 707/706

(58) Field of Classification Search ............... 707/3, 707/6
See application file for complete search history.

(56) References Cited

U.S. PATENT DOCUMENTS

| | | | |
|---|---|---|---|
| 5,499,366 A | 3/1996 | Rosenberg | |
| 5,577,241 A | 11/1996 | Spencer | |
| 5,878,423 A | 3/1999 | Anderson | |
| 5,915,249 A | 6/1999 | Spencer | |
| 5,956,711 A * | 9/1999 | Sullivan et al. | 707/6 |
| 5,966,533 A | 10/1999 | Moody | |
| 5,983,214 A | 11/1999 | Lang | |
| 5,983,227 A | 11/1999 | Nazem | |
| 5,991,756 A | 11/1999 | Wu | |
| 6,012,053 A | 1/2000 | Pant | |
| 6,029,161 A | 2/2000 | Lang | |
| 6,073,241 A | 6/2000 | Rosenberg | |
| 6,112,203 A | 8/2000 | Bharat | |
| 6,128,623 A | 10/2000 | Mattis | |
| 6,128,627 A | 10/2000 | Mattis | |
| 6,138,113 A | 10/2000 | Dean | |
| 6,205,469 B1 | 3/2001 | Graham | |
| 6,209,003 B1 | 3/2001 | Mattis | |
| 6,216,157 B1 | 4/2001 | Vishwanath | |
| 6,219,671 B1 | 4/2001 | DeVries | |
| 6,230,155 B1 | 5/2001 | Broder | |
| 6,230,158 B1 | 5/2001 | Burrows | |
| 6,266,657 B1 | 7/2001 | DeVries | |
| 6,275,827 B1 | 8/2001 | DeVries | |
| 6,289,358 B1 | 9/2001 | Mattis | |
| 6,292,880 B1 | 9/2001 | Mattis | |
| 6,308,175 B1 | 10/2001 | Lang | |
| 6,308,214 B1 | 10/2001 | Plevyak | |
| 6,311,189 B1 | 10/2001 | DeVries | |
| 6,314,420 B1 | 11/2001 | Lang | |
| 6,317,741 B1 | 11/2001 | Burrows | |
| 6,321,220 B1 | 11/2001 | Dean | |
| 6,321,265 B1 | 11/2001 | Najork | |

(Continued)

*Primary Examiner*—Tony Mahmoudi
*Assistant Examiner*—Paul Kim
(74) *Attorney, Agent, or Firm*—Lesavich High-Tech Law Group, P.C.; Stephen Lesavich

(57) ABSTRACT

A method and system for creating a vertical search engine. The method and system may help allow "vortals" to be created for the Internet and other computer networks that efficiently index and search lists of Uniform Resource Locators ("URLs") created from an appropriate list of keywords for a selected topic. Vortals include information pertinent to a targeted topic of a very small horizontal breath, but a larger depth. The created vortals may provide greater user satisfaction and less user frustration when searching for information about a selected topic.

14 Claims, 8 Drawing Sheets

U.S. PATENT DOCUMENTS

| | | |
|---|---|---|
| 6,332,144 B1 | 12/2001 | DeVries |
| 6,343,302 B1 | 1/2002 | Graham |
| 6,349,296 B1 | 2/2002 | Broder |
| 6,359,633 B1 | 3/2002 | Balasubramaniam |
| 6,360,215 B1 | 3/2002 | Judd |
| 6,381,594 B1 | 4/2002 | Eichstaedt |
| 6,442,606 B1 | 8/2002 | Subbaroyan |
| 6,463,430 B1 * | 10/2002 | Brady et al. .................. 707/3 |
| 6,490,575 B1 * | 12/2002 | Berstis .......................... 707/3 |
| 6,714,934 B1 | 3/2004 | Fordham |

* cited by examiner

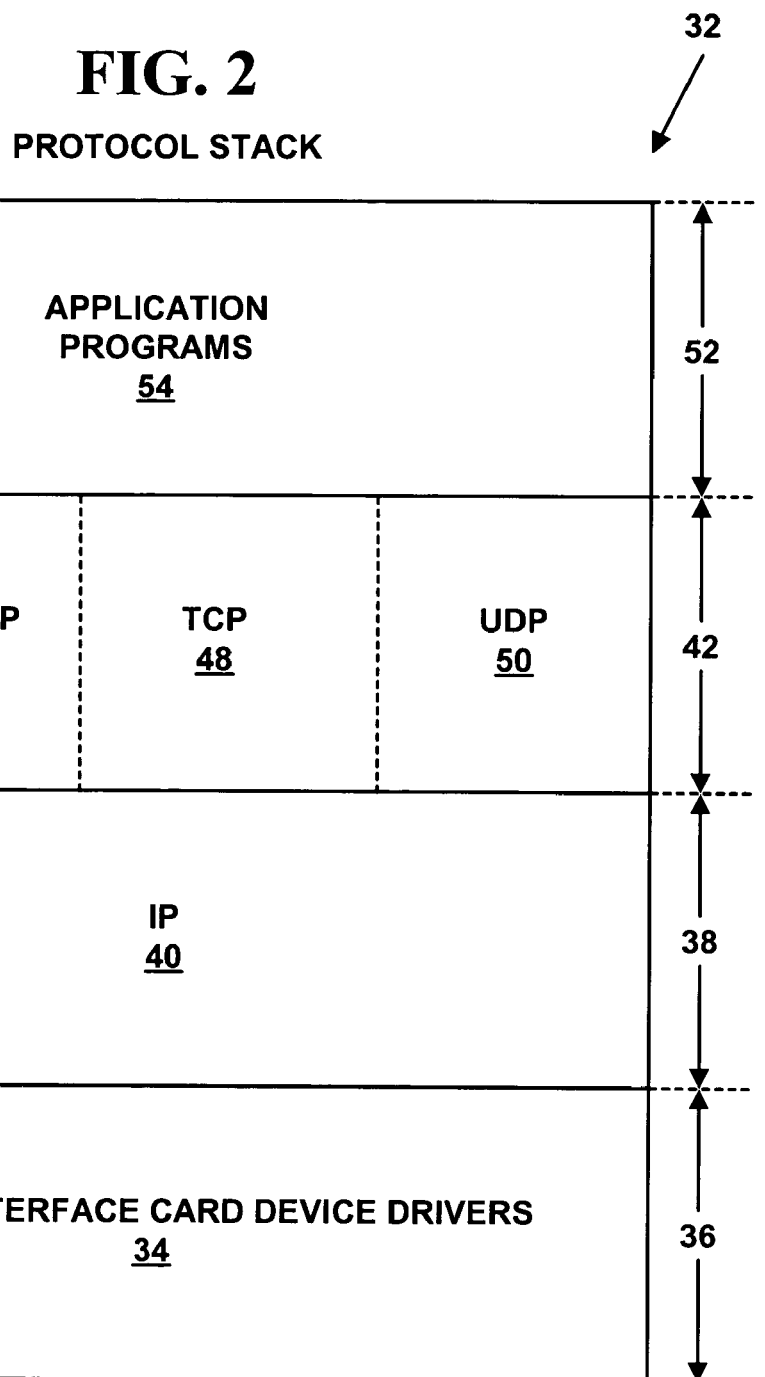

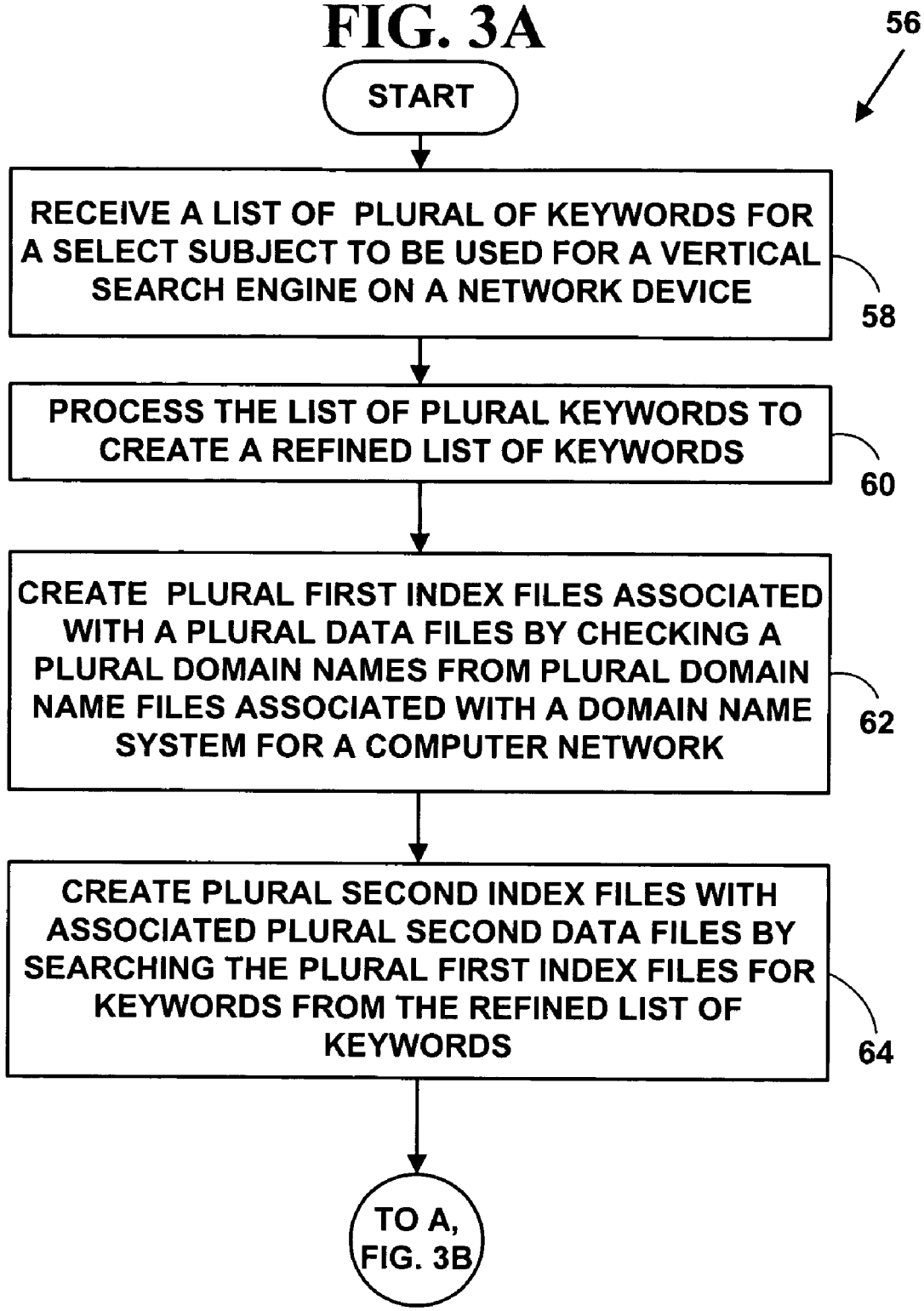

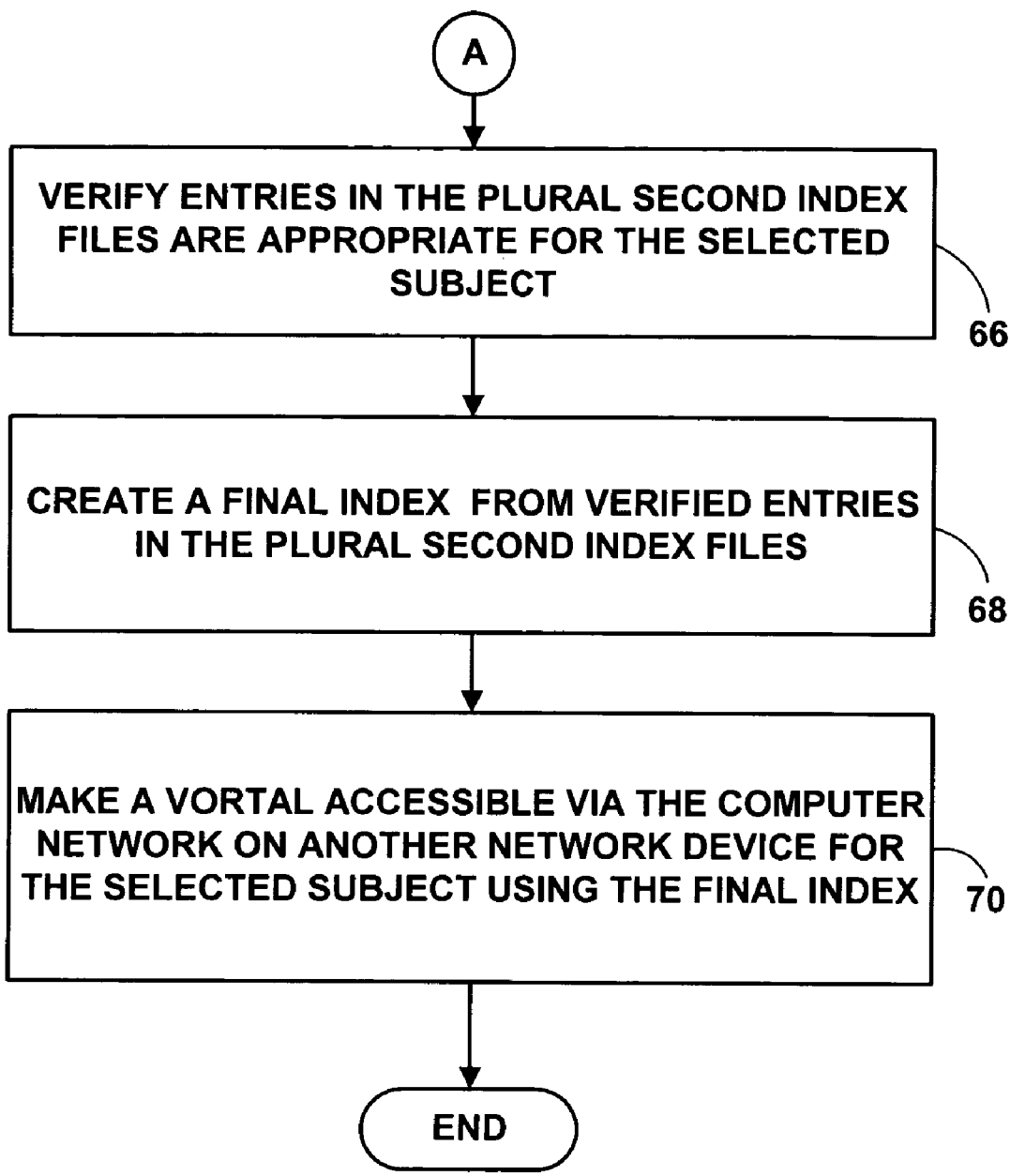

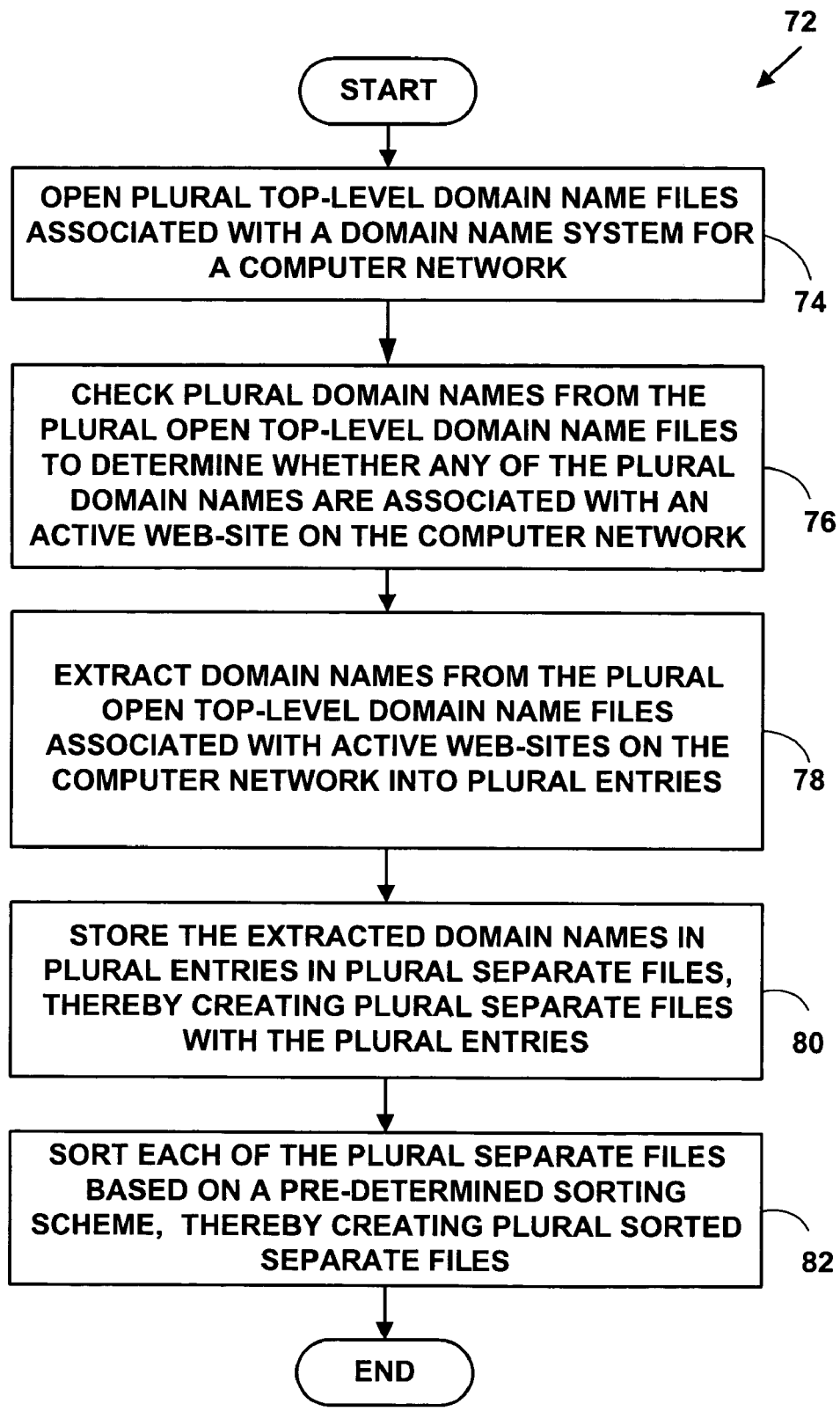

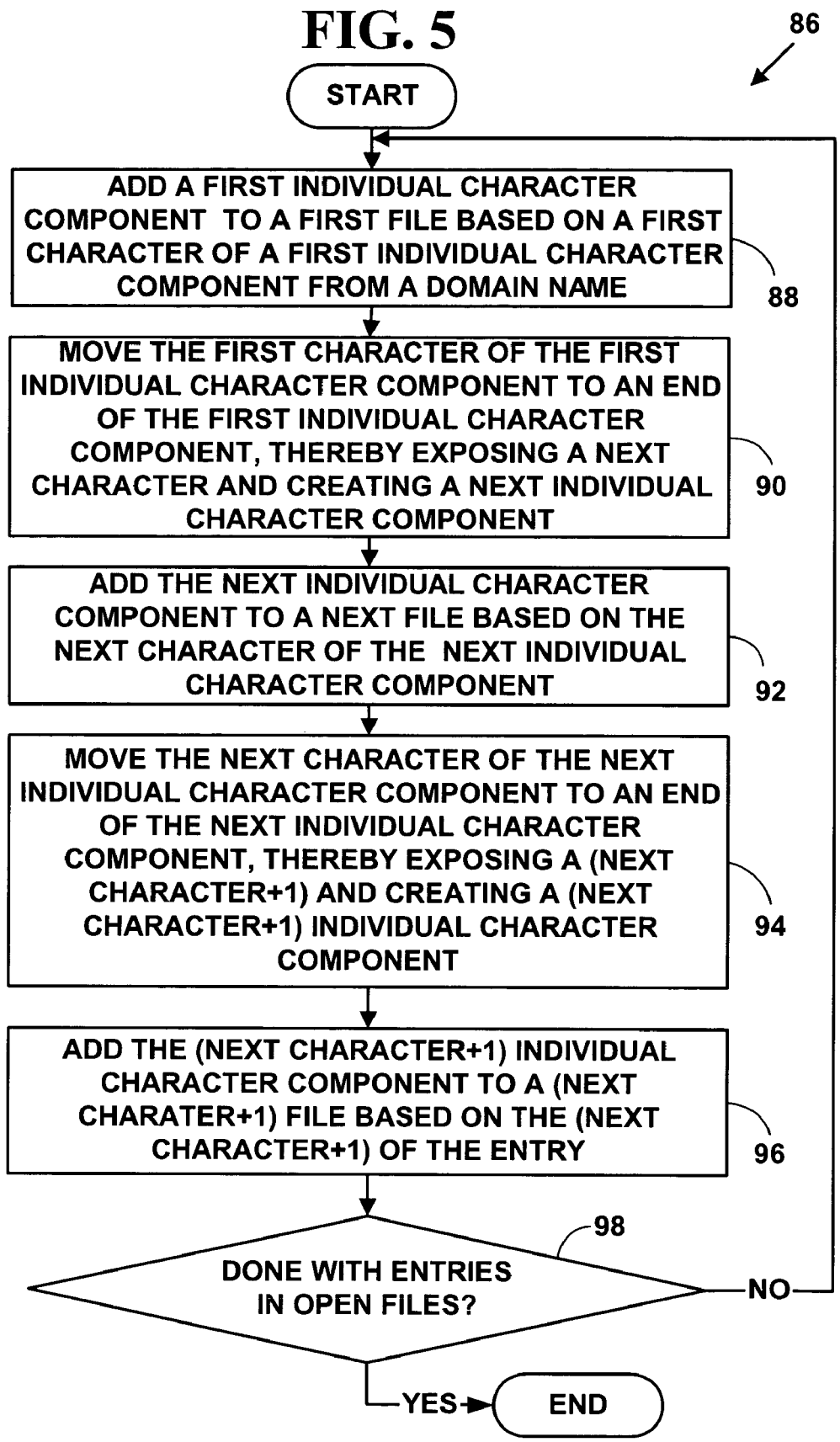

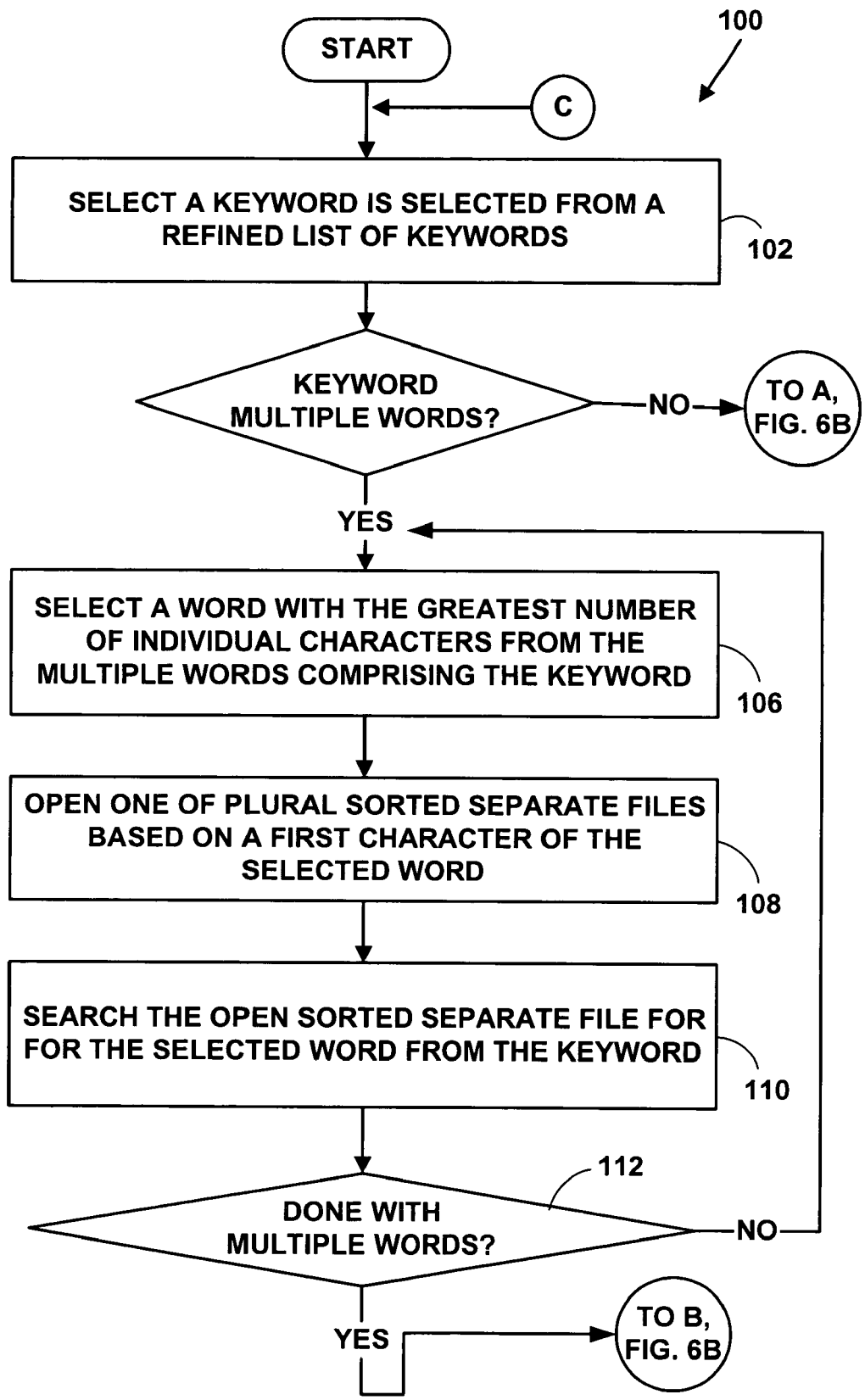

METHOD AND SYSTEM FOR CREATING VERTICAL SEARCH ENGINES

CROSS REFERENCES TO RELATED APPLICATIONS

This U.S. application is a Divisional of U.S. application Ser. No. 09/918,838 filed on Jul. 31, 2001, that issued as U.S. Pat. No. 6,714,934 B1 on Mar. 30, 2004, the contents of which are incorporated by reference.

FIELD OF THE INVENTION

This application relates to indexing and searching electronic information on a computer network. More specifically, this invention relates to a method and system for creating vertical search engines.

BACKGROUND OF THE INVENTION

As is known in the art, the Internet is a world-wide interconnected network of devices including computers, servers, gateways, routers and other devices. The World-Wide-Web is collection of servers and other devices on the Internet that support electronic document exchange. Electronic documents on the World-Wide-Web are formatted in special languages called mark-up languages, that support electronic links or "hyperlinks" to other documents, as well as to graphics, audio, video, animation and other types of electronic content. The mark-up languages include, Hyper Text Markup Language ("HTML"), Extensible Markup Language ("XML"), and many others.

As is known in the art, a "search engine" is a software program that searches documents for specified keywords and returns a list of hyperlinks to the documents where the keywords were found. Although a search engine is really a general class of programs, the term is often used to specifically describe systems like Yahoo, Lycos, Alta Vista, Excite, Google and others that enable users to search for electronic content on the World-Wide-Web.

Typically, a search engine works by sending out a software "spider" to fetch as many electronic documents as possible. Another program, called an "indexer," then reads these documents and creates an index of Uniform Resource Locators ("URL") based on the keywords contained in each document. Each search engine typically uses a distinct proprietary algorithm to create its indices such that meaningful results are returned for each query.

As is known in the art, a "spider" is an automated program that searches the Internet for new World-Wide-Wed documents. An "indexer" indexes the corresponding URLs and content-related information in a database, which can be examined for matches by a search engine. Spiders are generally considered to be a type of "bot," or Internet robot and are also called "crawlers."

Most search engines are also general portal sites. As is known in the art, a "portal" is a web-site or service that offers a broad array of resources and services, such as e-mail, forums, chat rooms, search engines, on-line shopping malls, etc. American On-Line ("AOL"), the Microsoft Network ("MSN") and others are general portal sites.

However, there are a number of problems associated with search engines that are general portals. One problem is that a general search engine is designed to provide all types of general information to all types of users. A general search engine's search algorithms are typically designed to "horizontally" search for a breath of information to provide general types of information. This horizontal search approach causes individuals looking for specific information on the World-Wide-Web to look through hundreds, if not thousands, of irrelevant pieces of information to finally locate the information they seek, provided they find it at all.

Another problem is that general search engines often return indexes including a large number of links to information that is not closely related to a search requested by a user. This makes it difficult for a user to locate desired information and often leads to user confusion and user dissatisfaction.

Another problem is that vague search terms used in a general search engine return a large a huge number of results. However, a vague search term may be a term of art or all the user knows. The vague search term may not be vague at all when applied to a specific topic or a specific topic.

There have been attempts to solve some of the problems associated with general search engines using vertical search engines or "vortals." As is known in the art, a vortal is a specific type of search engine that provides information and resources related only to one (or a small number) specific topic. These sites typically contain focused information, such as "vertical" or "in-depth" information pertinent only to their particular targeted topic of interest. Vortals include information pertinent to a targeted topic of a very small horizontal breath, but a larger depth. Vortals are designed to include "the" source of pertinent information on the World-Wide-Web for a "community of interest."

Vortals typically provide news, research and statistics, discussions, newsletters, online tools, and many other services that educate users about a specific topic. Vortals typically use specialized searching algorithms to search and provide only information about a specific topic.

For example, a vortal may be created for people interested in the sport of golf. On a general search engine, if a user typed in a search using the vague keyword "Tiger" to search for URLs including hyperlinks to information about the golfer Tiger Woods, the general search engine would return thousands of URLs including animals, product names, nicknames, television programs, movie names and a large amount of other information. The user would have to look through a large number of pages to find information on the golfer Tiger Woods.

A user could qualify a search on a general search engine. For example, a user may enter a search using the keywords "Tiger and Golf" or "Tiger Woods." However, such a search on a general search engine still returns information un-related to the golfer Tiger Woods such as information about animal and forestry. In addition, most general search engines and require a user develop some knowledge and expertise on how general search engines work to create and successfully use a qualified search.

In contrast, on a vortal specifically designed for golf, entering a search using the vague keyword "Tiger" would only return information about the golfer Tiger Woods. A user would have to sort through, very little if any, information not related to the golfer Tiger Woods. Even very vague search terms on a vortal can be used to return highly relevant search results for a particular vortal.

Vortals are also being used for electronic commerce ("e-commerce") including Business-to-Business ("B2B"), Business-to-consumer ("B2C") and other types of e-commerce transactions. For example, buyers and sellers with different procurement and catalog systems use B2B vortals to interoperate and cooperate effectively.

However, there are also a number of problems associated with vortals. One problem is that it is difficult to create an appropriate list of keywords to be used for a vortal. Another problem is that it is difficult to create indexes including URLs and electronic content from web pages, and search such indexes. Another problem is that it is difficult to verify whether all indexes including URLs and electronic content for a given vortal are appropriate for a selected topic. These problems and other problems with vortals often lead to user frustration and user satisfaction.

Thus, it is desirable to provide new types vertical search engines for vortals. The vertical search engines should allow vortals to be created that efficiently index and search lists of URLs created from an appropriate list of keywords for a selected topic.

SUMMARY OF THE INVENTION

In accordance with preferred embodiments of the present invention, some of the problems associated with vertical search engines are overcome. A method and system for creating a vertical search engine is provided.

The method and system describe herein may help allow vortals to be created that efficiently index and search lists of URLs created from an appropriate list of keywords for a selected topic. Such vortals may provide greater user satisfaction and less user frustration.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a layered protocol stack for network devices in the vertical search engine system of FIG. 1;

FIGS. 3A and 3B are a flow diagram illustrating a method for creating a vertical search engine;

FIG. 4 is a flow diagram illustrating a method for creating an index for a vertical search engine list;

FIG. 5 is a flow diagram illustrating a method for parsing a keyword for a vertical search engine; and FIGS. 6A and 6B are a flow diagram illustrating a method for searching an index created for a vertical search engine.

DETAILED DESCRIPTION OF PREFERRED EMBODIMENTS EXEMPLARY VERTICAL SEARCH ENGINE SYSTEM

Figure 1:
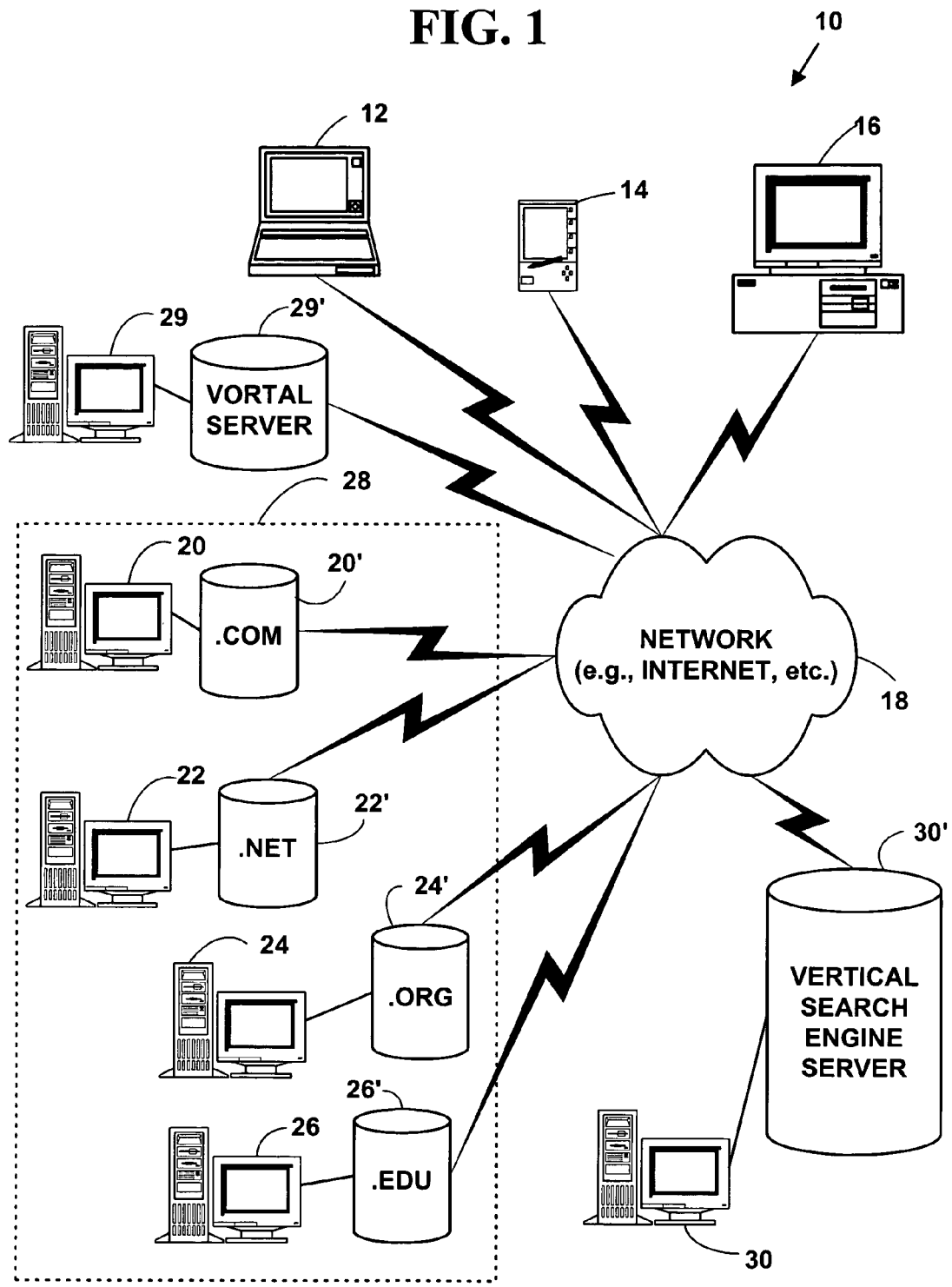
FIG. 1 is a block diagram illustrating an exemplary vertical search engine system.

FIG. 1 is a block diagram that illustrates an exemplary vertical search engine system 10. The vertical search engine system 10 includes, but is not limited to, one or more client network devices 12, 14, 16 (only three of which are illustrated).

The client network devices 12, 14, 16 include, but are not limited to, personal computers, wireless devices, laptop computers, mobile phones, personal information devices, personal digital assistants, hand-held devices, network appliances, pagers, and other types of electronic devices. However, the present invention is not limited to these devices and more, fewer or others types of client electronic devices can also be used.

The client network devices 12, 14, 16 are in communications with a computer network 18 (e.g., the Internet, intranet, etc.). The communication includes, but is not limited to, communications over a wire connected to the client network devices, wireless communications, and other types of communications.

Plural server network devices 20, 22, 24, 26 (only four of which are illustrated) with one or more associated databases 20', 22', 24', 26' are in communications with the computer network 18. The plural network devices 20, 22, 24, 26 are part of a "domain name system" 28. Other server devices 29 (one of which is illustrated) are used to provide access to a vortal created with the present invention and described below.

As is known in the art, a "domain name" is a textual name that identifies one or more network addresses. On the Internet, a domain name identifies on or more Internet Protocol ("IP") addresses. As is known in the art, IP is a routing protocol designed to route traffic within a network or between networks. An IP address is issued in the format X.X.X.X, where each X represents a number between zero and 255. For example an IP address for of 128.45.64.35 may be issued for a network server.

Domain names make it easier for people to identify sites on the Internet including the World-Wide-Web and other computer networks. If a textual domain name is not used, then a person would have to remember or memorize many different IP addresses to locate sites or information on the Internet 18 or other computer networks.

A domain name has a suffix that indicates which top-level domain ("TLD") it belongs to. There are currently only a limited number of TLDs including: (1) ".COM," for commercial businesses; (2) ".EDU," for educational institutions; (3) ".GOV," for government agencies; (4) ".MIL," for the military; (5) ".NET," for network organizations and (6) ".ORG," for organizations including non-profit organizations. However, there have been recent proposals to add new TLDs including ".BIZ," for businesses, ".FIRM," for professional organizations such as law firms, accounting firms, and others.

Domain names are used by people in URLs entered into web-browsers or other applications to identify particular web-sites on the Internet, intranets or other computer networks. Since sites on the Internet and other computer networks are actually identified by IP addresses and not domain names, web servers typically require assistance from Domain Name Servers ("DNS") to translate domain names into IP addresses.

The Internet Engineering Task Force ("IETF") has a number of sets of documents that describe operation of the Internet and the World-Wide-Web. Once such set of documents is called the IETF Request For Comments ("RFC"). IETF documents can be found on the Internet at the URL "www.ietf.org." Hereinafter, IETF RFCs will be designated only by RFC-xxx, wherein xxx is an IETF RFC number. For information on the Internet DNS see RFC-1034, 1035, 1591 and 2929, the contents of all of which are incorporated by reference.

The vertical search engine system 10 further includes one or more (only one is illustrated) vertical search engine servers 30 with associated databases 30'. However, more, fewer or other components can also be used and the present invention is not limited to the illustrated components.

An operating environment for components of the vertical search engine system 10 for preferred embodiments of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals or biological signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

FIG. 2 is a block diagram illustrating a layered protocol stack 32 for network devices in the vertical search engine system 10. The layered protocol stack 32 is described with respect to Internet Protocol suites comprising in general from lowest-to-highest, a link, network, transport and application layer. However, more or fewer layers could also be used, and different layer designations could also be used for the layers in the protocol stack 32 (e.g., layering based on the Open Systems Interconnection ("OSI") model including from lowest-to-highest, a physical, data-link, network, transport, session, presentation and application layer.).

The network devices 12, 14, 16, 18, 20, 22, 24, 26, 30 are connected to the computer network 18 with Network Interface Card ("NIC") device drivers 34 in a link layer 36 for the actual hardware connecting the network devices to the computer network 18. For example, the NIC device drivers 34 may include a serial port device driver, a modem device driver, an Ethernet device driver, etc. The device drivers interface with the actual hardware being used to connect the network devices to the computer network 18.

Above the link layer 34 is a network layer 38 (also called the Internet Layer for Internet Protocol suites). The network layer 38 includes, but is not limited to, an IP layer 40. As is known in the art, IP 40 is an addressing protocol designed to route traffic within a network or between networks. However, more fewer or other protocols can also be used in the network layer 38, and the present invention is not limited to IP 40. IP layer 40, hereinafter IP 40, is described in RFC-791, incorporated herein by reference.

Above network layer 38 is a transport layer 42. The transport layer 42 includes, but is not limited to, an optional Internet Group Management Protocol ("IGMP") layer 44, a Internet Control Message Protocol ("ICMP") layer 46, a Transmission Control Protocol ("TCP") layer 48 and a User Datagram Protocol ("UDP") layer 50. However, more, fewer or other protocols could also be used in the transport layer 42.

Optional IGMP layer 44, hereinafter IGMP 44, is responsible for multicasting. For more information on IGMP 44 see RFC-1112, incorporated herein by reference.

ICMP layer 46, hereinafter ICMP 46, is used for IP 40 control. The main functions of ICMP 46 include error reporting, reachability testing (e.g., "pinging"), route-change notification, performance, subnet addressing and other maintenance. For more information on ICMP 46 see RFC-792, incorporated herein by reference. Both IGMP 44 and ICMP 46 are not required in the protocol stack 32. ICMP 46 can be used alone without optional IGMP layer 44.

TCP layer 48, hereinafter TCP 48, provides a connection-oriented, end-to-end reliable protocol designed to fit into a layered hierarchy of protocols which support multi-network applications. TCP 48 provides for reliable inter-process communication between pairs of processes in network devices attached to distinct but interconnected networks. For more information on TCP 48 see RFC-793, incorporated herein by reference.

UDP layer 50, hereinafter UDP 50, provides a connectionless mode of communications with datagrams in an interconnected set of computer networks. UDP 50 provides a transaction oriented datagram protocol, where delivery and duplicate packet protection are not guaranteed. For more information on UDP 50 see RFC-768, incorporated herein by reference. Both TCP 48 and UDP 50 are not required in protocol stack 32. Either TCP 48 or UDP 50 can be used without the other.

Above transport layer 42 is an application layer 52 where application programs 54 to carry out desired functionality for a network device reside. For example, the application programs 54 for the client network devices 12, 14, 16 may include a web-browsers or other application programs 54, while application programs for the server network devices 20, 22, 24, 26, 30 may include vertical search engine application programs or other application programs 54.

However, the protocol stack 32 is not limited to the protocol layers illustrated and more, fewer or other layers and protocols can also be used in protocol stack 32. In addition, other protocols from the Internet Protocol suites (e.g., Simple Mail Transfer Protocol, ("SMTP"), Hyper Text Transfer Protocol ("HTTP"), File Transfer Protocol ("FTP"), Dynamic Host Configuration Protocol ("DHCP"), DNS, etc.) and protocols from other protocol suites may also be used in protocol stack 32.

Creating A Vertical Search Engine

FIGS. 3A and 3B are a flow diagram illustrating a Method 56 for creating a vertical search engine. In FIG. 3A at Step 58, a list of plural keywords to be used for the vertical search engine is received on a network device. The list of keywords includes general and specific keywords for a selected subject. At Step 60, the list of plural keywords is processed to create a refined list of keywords. The processing includes adding, subtracting or modifying the list of plural keywords.

At Step 62, plural first index files associated with plural first data files are created by checking plural domain names from plural domain name files associated with a domain name system for a computer network. The plural first index files include plural pointers to the associated first data files. The plural data files include plural entries including electronic information extracted from plural web-sites associated with plural active domain names from the plural domain name files.

At Step 64, plural second index files with associated a plural second data files are created by searching the plural first index files for keywords from the refined list of keywords. The plural second index files include plural pointers to the associated plural second data files. The plural second data files include plural entries including electronic information extracted from plural web-sites associated with the plural active domain names for keywords from the refined list of keywords.

In FIG. 3B at Step 66, entries in the plural second index files are verified as appropriate for the selected subject. At Step 68, a final index is created from the verified entries in the plural second index files. At Step 70, a vortal is made accessible on another network device via the computer network for the selected subject using the final index.

Method 56 is illustrated with an exemplary embodiment. However, the present invention is not limited to this exemplary embodiment and other embodiments with other components can also be used to practice Method 56.

In such an exemplary embodiment in FIG. 3A at Step 58, a list of plural of keywords to be used for the vertical search engine is received on the vertical search engine server 30. The list of keywords includes general and specific keywords for a selected subject.

In an exemplary embodiment of the present invention, the list of keywords is received from a client network device 12, 14, 16, automatically by the vertical search engine server 30 in a data file or data stream via protocol stack 32. In another embodiment of the present invention, the list of keywords is obtained and manually entered into the vertical search engine server 30 by system administrator or other personal using an application program 54 on the vertical search engine server 30. However, the present invention is not limited to these two embodiments and the list of keywords can also be received in other ways.

At Step 60, the list of plural keywords is processed to create a refined list of keywords. The processing includes adding, subtracting or modifying the list of plural keywords. In an exemplary embodiment of the present invention, Step 60 includes, but is not limited to, eliminating keywords that are too generic or have multiple meanings; modifying keywords by adding alternative spellings and/or adding additional words to make a keyword more distinct; or automatically adding synonyms for keywords to the list of plural keywords to create the refined list of keywords. However, the present invention is not limited to the processing described and more, fewer or other processing steps can also be used.

At Step 62, plural first index files associated with plural first data files are created by checking plural domain names from plural top-level domain name files associated with the DNS for the Internet. The plural first index files include plural pointers to the associated first data files. The plural data files include plural entries including electronic information extracted from plural web-sites associated with plural active domain names from the plural domain name files.

In an exemplary embodiment of the present invention, the plural pointers are plural file pointers and the plural entries in the plural data files include a title, description, URL and a pre-determined amount of electronic content associated with a web-site associated with an active domain name. The title, description and pre-determined amount of electronic content (e.g., n-number of lines of HTML/XML, n-number of lines of text, n-number of video files, n-number of audio files, n-number of graphical files, etc.) are extracted from an active web-site by and downloaded back to the vertical search engine server 30. However, the present invention is not limited to such an embodiment and the plural pointers can include other types of pointers and the plural entries in the plural data files can include more, fewer or other information.

An "active" domain name is a domain name that is actively being hosted on the Internet and includes at least one page of electronic content (e.g., a home page, etc.). An "inactive" domain name is a domain name that is not actively being hosted and/or does not include at least one page of useful electronic content. An inactive domain name may include a domain name that is actively being hosted, but for which the domain name is "parked" since the domain name is being offered for sale. An inactive web-site is a web-site that has at least one page of electronic content but the electronic content is not useful. For example, the electronic content may be a web-page that indicates that the web-site still under construction, is coming soon, is for sale, and include no other useful information related to the keywords in the refined list of keywords. However, the present invention is not limited to such an embodiment and other criteria can also be used to distinguish an "active" web-site from an "inactive" web-site.

In an exemplary embodiment of the present invention, the checking part of Step 62 includes the steps illustrated by Method 72. However, the present invention is not limited to such an embodiment, and more, fewer or other steps can also be used for the check part of Step 62. In addition, Method 72 can also be used as a stand-alone method for creating indexes for a vertical search engine list, a general search engine list, or other lists of keywords, words, etc.

FIG. 4 is a flow diagram illustrating a Method 72 for creating an index for a vertical search engine. At Step 74, plural top-level domain name files associated with a domain name system are opened. At Step 76, plural domain names are checked from the plural open top-level domain name files to determine whether any of the plural domain names are associated with an active web-site on the computer network. At Step 78, domain names in the plural open top-level domain name files associated with active web-sites on the computer network are extracted. At Step 80, the extracted domain names are stored in plural entries in plural separate files, thereby creating plural separate files including the plural entries. At Step 82, the plural separate files are sorted based on a pre-determined sorting scheme, thereby creating plural sorted separate files. Method 72 is illustrated with an exemplary embodiment. However, the present invention is not limited to this exemplary embodiment and other embodiments with other components can also be used to practice Method 72.

In such an exemplary embodiment, Step 74 includes opening a .COM, .EDU, .GOV, .MIL, .NET, .ORG, and/or any other top-level domain names currently being used and associated with the Internet DNS. As is known in the art, top-level domain name zone files are files including active domain names that are used to populate root and other DNS servers to resolve domain names into IP addresses. For more information on TLDs, see RFC-1591, the contents of which are incorporated by reference.

Network Solutions, Inc. ("NSI") under contract with the National Science Foundation was the exclusive registrar of TLD's from 1993-1998. The Internet Corporation for Assigned Names and Numbers ("ICANN") was established in 1998 to move the administration of the DNS to the private sector. There are now several different approved organizations that can register domain names in association with ICANN. The NSI and any other ICANN authorized top-level domain name zone files are searched.

In an exemplary embodiment of the present invention, the top-level domain name zone files are copied from the NSI web-site and any other ICANN authorized web-sites and opened locally on the vertical search engine server 30. In another embodiment of the present invention, the top-level domain name zone files are opened locally on the vertical search engine server 30 from remote locations via the computer network 18. However, the present invention is not limited to such embodiments and the top-level domain name zone files can be open in other ways.

In another embodiment of the present invention, the user domain name files include files of domain names supplied by users. Such users may also have supplied keywords to create a vortal. Such user domain name files are also searched along with the Internet top-level domain name files.

At Step 76, plural domain names are checked from the plural open top-level domain name files to determine whether any of the plural domain names are associated with an active web-site on the computer network. In an exemplary embodiment Step 76 includes attempting to visit a web-site on the Internet 18 with a software spider to determine whether the web-site is active. If the spider can't access a web-site associated with a domain name, then the domain name is marked as inactive. If the spider is able to access the web-site, then the spider checks for electronic content stored on the web-site such as a home page, etc. If the web-site does not have any electronic content, the domain name is marked as inactive. If the web-site has electronic content, the spider will parse the electronic content for a title, description and a pre-determined amount of electronic content. The spider may also follow hyperlinks to on the web-site to other pages of electronic content to find the appropriate amount of electronic content. If a title, description of a pre-determined amount of electronic content cannot be found, the web-site, may be marked as inactive. If a title, description and a pre-determined amount of electronic content can be found the web-site is marked as active and the title, description and pre-determined amount of electronic content are extracted and stored in one of plural associated data files that are linked to a first index file. However, the present invention is not limited to this embodiment and the checks at Step 76 can be practiced with other than a spider.

At Step 78, domain names in the plural open top-level domain name files associated with active web-sites on the computer network are extracted. At Step 80, the extracted domain names are stored in plural entries in plural separate files, thereby creating plural separate files including the plural entries.

In an exemplary embodiment of the present invention, the created plural separate files including the plural entries include the plural first index files associated with plural first data files.

In another exemplary embodiment of the present invention, Steps 78 and 80 include the steps illustrated by Method 86. However, the present invention is not limited to such an embodiment, and more, fewer or other steps can also be used to practice Steps 78 and 80. In addition, Method 86 can also be used as a stand-alone method for parsing keywords for a vertical search engine, other search engines (e.g., general search engines, etc.), parsing words, etc.

FIG. 5 is a flow diagram illustrating a Method 86 for parsing a keyword for a vertical search engine. At Step 88, a first individual character component is added to a first file based on a first character of first individual character component. The first individual character component was derived from an extracted domain name entry from an open top-level domain name file. At Step 90, the first character of the first individual character component is moved to an end of the first individual character component, thereby exposing a next character and creating a next individual character component. At Step 92, the next individual character component is added to a next file based on the next character of the next individual character component. At Step 94, the next character of the next individual character component is moved to an end of the next individual character component, thereby exposing a (next character+1) and creating a (next character+1) individual character component. At Step 96, the (next character+1) individual character component is added to a (next charater+1) file based on the (next character+1) of the (next character+1) individual character component. At Step 98, a loop is entered to repeat steps 94 and 96 until first character of the first individual character component is reached, wherein the parsing continues with a next original entry in the open top-level domain file at Step 88.

The parsing method illustrated by Method 86 helps improve indexing and searching speeds for queries to a vortal. In an exemplary embodiment of the present invention, all characters in the first individual character component are parsed. In another embodiment of the present invention, less than all of the character in the first individual character component are parsed. However, the present invention is not limited to these embodiments and other parsing schemes can also be used.

In an exemplary embodiment of the present invention, steps 88-98 are repeated for all entries in all open top-level domain name files. In another embodiment of the present invention, Steps 88-98 are repeated for less than all entries in less than all open top-level domain name files based on pre-determine selection criteria.

Method 86 is illustrated with an exemplary embodiment. However, the present invention is not limited to this exemplary embodiment and other embodiments with other components can also be used to practice Method 86.

Method 86 is illustrated with an exemplary domain name entry "MUSIC-CLUB.NET" from the open top-level domain name file .NET. This domain name entry is exemplary only, and the present invention is not limited to this domain name or domain names from the top-level domain name file .NET.

At Step 88, a first individual character component MUSIC-CLUB is added to a first file called the "M" file based on the first character "M" of the original domain name entry "MUSIC-CLUB." The first individual character component MUSIC-CLUB was derived from the original entry "MUSIC-CLUB.NET" from the open top-level domain name file .NET. The original domain name entry was parsed up to the dot in MUSIC-CLUB.NET. The characters before the dot are included in the first individual character component.

At Step 90, the first character "M" of the first individual character component "MUSIC-CLUB" is moved to an end of the original entry, thereby exposing a next character "U" and creating a next individual character component, "USIC-CLUBM."

At Step 92, the next individual character component "USIC-CLUBM" is added to a next file called "U" based on the next character "U" of the next individual character component.

At Step 94, the next character of the next individual character component "U" is moved to an end of the next individual character component "USIC-CLUBM", thereby exposing a (next character+1) "S" and creating a (next character+1) individual character component "SIC-CLUBMU."

At Step 96, the (next character+1) individual character component "SIC-CLUBMU" is added to a (next charater+1) file called "S" based on the (next character+1) "S" of the (next character+1) individual character component.

At Step 98, a loop is entered to repeat steps 94 and 96 until first character "M" of the original individual character component is reached, wherein the parsing continues with a next original entry in the open .NET file at Step 88.

Table 1 illustrates the parsing steps for the original individual character component "MUSIC" completed by Method 86.

TABLE 1

| Individual character component (first, next, next+1, next+2, etc.) | File (first, next, next+1, next+2, etc.) |
|---|---|
| MUSIC-CLUB | "M" File |
| USIC-CLUBM | "U" File |
| SIC-CLUBMU | "S" File |
| IC-CLUBMUS | "I" File |
| C-CLUBMUSI | "C" File |
| -CLUBMUSIC | "—" File |
| CLUBMUSIC- | "C" File |
| LUBMUSIC-C | "L" File |
| UBMUSIC-CL | "U" File |
| BMUSIC-CLU | "B" File |
| MUSIC-CLUB | Parsing continues with the next original entry from the .NET file |

Method 86 assumes individual character components of three or more characters. However, Method 86 can also be used with individual character components with one character by executing only Steps 88 and 98 and for individual character components with two characters by executing only steps 88, 90, 92 and 98. However, keywords with one or two characters will rarely, if ever be used.

In an exemplary embodiment of the present invention, the possible plural separate files include one file for each letter of the English alphabet (A-Z) (with all lowercase letters converted to all uppercase letters, or visa-versa) the numbers zero through nine. This is total of 36 possible files, since these characters are currently the only valid characters that allowed for use in domain names. However, if other characters were allowed use with domain names, Method 86 would generate more than 36 possible files without changing any of the steps of Method 86. Any additional files would include files for any additional allowable domain name characters.

Returning to Method 72 (FIG. 4) at Step 82, the plural separate files are sorted based on a pre-determined sorting scheme to create plural sorted separate files. In an exemplary embodiment of the present invention, the pre-determined sorting scheme includes sorting the plural separate files based on ASCII values of characters stored in the plural separate files. As is known in the art, ASCII is an acronym for the "American Standard Code for Information Interchange." ASCII is an encoding scheme for representing English characters as numbers, with each letter assigned a number from 0 to 127. Most computers use ASCII codes to represent English characters.

In an exemplary embodiment of the present invention, the pre-determined sorting scheme includes sorting each of the plural separate files in ascending ASCII order. However, the present invention is not limited to such an embodiment and other sorting orders (e.g., descending, other, etc.) can also be used. In ascending ASCII order, the ASCII characters "4music-club," would be appear before "music-club," since the ASCII value of "4" is smaller than the ASCII value of "L."

Figure 6B:
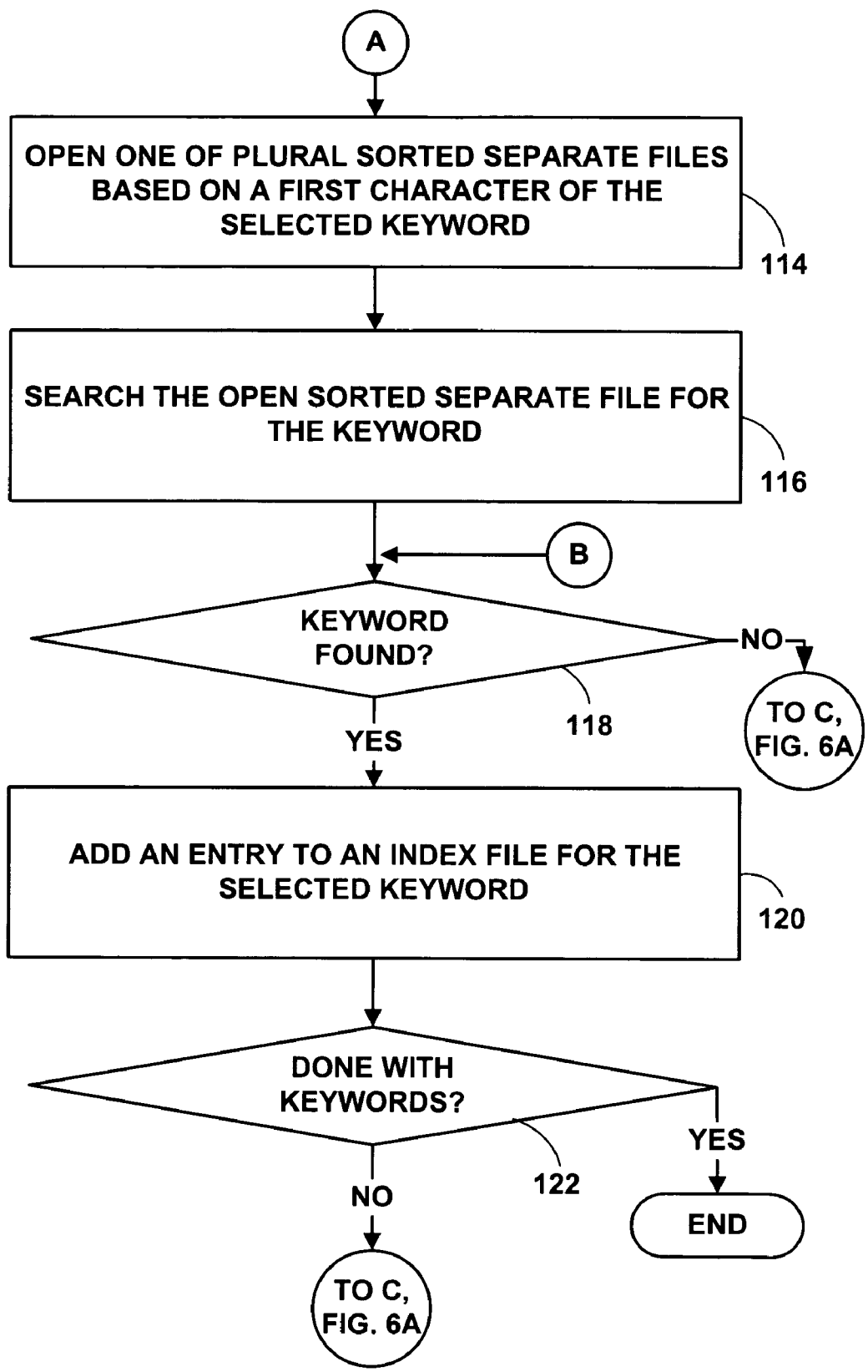

Returning to Method 56 (FIG. 3A) at Step 64, plural second index files with associated a plural second data files are created by searching the plural first index files for keywords from the refined list of keywords. The plural second index files include plural pointers to the associated plural second data files. The plural second data files include plural entries including electronic information extracted from plural websites associated with the plural active domain names for keywords from the refined list of keywords FIGS. 6A and 6B are a flow diagram illustrating a Method 100 for searching an index created for a vertical search engine. In FIG. 6A at Step 102, a keyword is selected from the refined list of keywords. At Step 104, a test is conducted to determine whether the selected keyword comprises multiple words. If the selected keyword comprises multiple words, at Step 106 a word with the greatest number of individual characters from the multiple words comprising the keyword is selected. At Step 108, one of plural sorted separate files (e.g., one of plural first index files) based on a first character of the selected word is opened. The plural sorted separate files were created by indexing plural domain name files associated with a domain name system for the refined list of keywords (e.g., Method 72). At Step 110, the open sorted separate file for is searched for the selected word from the selected keyword. At Step 112, a test is conducted to determine if the processing of multiple words in a keyword is complete. If the processing of the multiple words of a keyword is not complete, processing resumes with Step 106. If the processing of the multiple words of a keyword is complete, processing resumes with Step 114 of FIG. 6B.

If the selected keyword does not comprise multiple words at Step 108, in FIG. 6B at Step 114 one of plural sorted separate files is opened based on a first character of the selected keyword. The plural sorted separate files were created by indexing plural domain name files associated with a domain name system for the refined list of keywords. At Step 116, the open sorted separate file is searched for the selected keyword.

At Step 118, a test is conducted to determine whether the selected keyword has been found in the open separate sorted, file. If the selected keyword has been found in the open separate sorted file, at Step 120, an entry is added to one of the plural second index files for the selected keyword. A test is conducted at Step 122 to determine if all keywords have been processed. If all keywords have not been processed, Steps 102, 104 and 116 are repeated for remaining keywords from the refined list of keywords. If all keywords have been processed, Method 100 terminates.

Method 100 is illustrated with an exemplary embodiment. However, the present invention is not limited to this exemplary embodiment and other embodiments with other components can also be used to practice Method 100.

In such an exemplary, embodiment at FIG. 6A at Step 102, a keyword is selected from the refined list of keywords. For example, the keyword "club-music" comprises multiple words while the keyword "clubmusic" comprises one word. The keyword "club-music" will be used as an illustrative example.

At Step 104, a test is conducted to determine whether the selected keyword "club-music" comprises multiple words. If the selected keyword comprises multiple words, at Step 106 a word with the greatest number of individual characters from the multiple words comprising the keyword is selected. In this example, the word "music" is selected since it has more letters than the word "club" (i.e., five letters instead of four letters).

At Step 108, one of plural sorted separate files, the "M" file is opened based on a first character "m" of the selected word "music." The plural sorted separate files were created as plural first index files by indexing plural domain name files associated with a domain name system. (e.g., Method 72).

At Step 110, the open sorted separate file "M" for is searched for the selected word "music" from the selected keyword "club-music." In an exemplary embodiment of the present invention, binary searching techniques are used. However, the present invention is not limited to binary search techniques and more, fewer or other searching techniques could also be used, (e.g., linear, exponential, etc.).

In an exemplary embodiment of the present invention, a first index file is searched to find a first occurrence of the keyword. After finding a first occurrence of the keyword in the first index file, a file pointer in the first index file is used to locate and open an associated first data file and a URL is returned from the associated first data file. However, the present invention is not limited to such an embodiment, and other embodiments can also be used to practice Method 100.

Since the keyword includes multiple words, the test conducted at Step 112 allows processing to continue at Step 106 for the remaining word "club" from the keyword "club-music." Steps 106-112 are repeated using the word "club."

In an exemplary embodiment of the present invention, if a keyword includes multiple keywords, file pointers from two first index files (e.g., the "M" and the "C") are compared to determine if they include identical information. If the file pointers include identical information, the keyword has been located in both first index files. When a keyword is located, a URL is returned from one of the first data files. If the file pointers are do not include identical information, the file pointers are advanced until they do or an end-of-file is reached.

At Step 118, in FIG. 6B a test is conducted to determine whether the selected keyword "club-music" has been found in the "M" file and the "C" file based on the individual words "music" and "club." If the selected keyword "club-music" has been found in the open separate sorted files "M" and "C", at Step 120, an entry is added to one or more second index file for the selected keyword "club-music." The entry includes at least a URL for the selected keyword extract from one of the first index files.

Returning to FIG. 3B at Step 66, entries in the plural second index files are verified as appropriate for the selected subject. In an exemplary embodiment of the present invention, entries in the plural second index files are verified by a human verifier. In such an embodiment, the entries in the plural second index files are inserted into vertical search engine database 30'. The vertical search engine database 30' includes multiple relational database management system ("RDMS") tables. An RDMS is a type of database management system ("DBMS") that stores data in the form of related tables. The URLs in the plural second index files are presented to the user to accept or decline the URL for use in the vertical search engine. The RDMS tables are updated to reflect the user's decision. The process continues until entries have been processed.

In another embodiment of the present invention, plural entries in plural second index files are preferably processed automatically based on a pre-determined set of criteria. In such an embodiment, the URLs in the plural second index files are presented to a verification application program 54 on the vertical search engine server 30. The verification application program 54 makes decisions on the URL based on pre-determined criteria similar to those made by a human users. The verification application program 54 may include an artificial intelligence ("AI") application program or other type of verification application program 54. However, the present invention is not limited to such embodiments and other embodiments can also be used to practice Step 66.

At Step 68, a final index is created from the verified entries in the plural second index files. In an exemplary embodiment of the present invention, the final index is created by extracting URLs from only those entries from the plural second index files that have been verified as appropriate at Step 66. The final index may be optionally optimized for fast, efficient searching. The optional optimizing includes re-sorting entries in the final index in an ordering appropriate for searching techniques that will be used to location information on a vortal. However, the present invention is not limited to such an embodiment, and other embodiments can also be used to practice Step 68.

At Step 70, a vortal is made accessible on the on a server network device via the Internet 18 for the selected subject using the final index. In an exemplary embodiment of the present invention, the vortal is made available on the vertical search engine server 30. In another embodiment of the present invention, the vortal is made available on the other server device 29. The vortal may also be made accessible on a client network device. However, the present invention is not limited to such embodiments and the vortal can be used on virtually any type of server network device via computer network 18.

When URLs are accessed in the final index, a spider is sent out over the computer network 18 to download a corresponding site's electronic content. After downloading the electronic content, it is parsed and merged into other indexes and data files associated with the vortal to increase searching speed for the vortal. The final index may be modified to further include pointers to the other indexes and data files associated with the vortal.

The methods and system describe herein may help allow vortals to be created that efficiently index and search lists of URLs created from an appropriate list of keywords for a selected topic. Such vortals may provide greater user satisfaction and less user frustration.

It should be understood that the programs, processes, methods and systems described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other types of elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for creating a vertical search engine, comprising:
receiving a list of a plurality of keywords to be used for the vertical search engine on a network device with one or more processors, wherein the list of keywords includes general and specific keywords for a selected subject;
processing the list of plurality of keywords to create a refined list of keywords, wherein the processing includes adding, subtracting or modifying automatically the list of plurality of keywords;
creating a plurality of first index files associated with a plurality of first data files by checking a plurality of domain names from a plurality of domain name files associated with a domain name system for a computer network, wherein the plurality of first index files include a plurality of pointers to the associated data files, and wherein the plurality of first data files include a plurality of entries including electronic information extracted from a plurality of web-sites associated with a plurality of active domain names from the plurality of domain name files, wherein creating the plurality of first index files includes opening a plurality of top-level domain name files associated with the domain name system for the computer network, checking a plurality of domain names from the plurality of open top-level domain name files to determine whether any of the plurality of domain names are associated with an active web-site on the computer network, extracting domain names in the plurality of open top-level domain name files associated with active web-sites on the computer network, storing the extracted domains names in a plurality of entries in a plurality of separate files, thereby creating a plurality of separate files including the plurality of entries, and sorting each of the plurality of separate files based on a pre-determined sorting scheme to create a plurality of sorted separate files;

creating a plurality of second index files with associated plurality of second data files by searching the plurality of first index files for keywords from the refined list of keywords, wherein the plurality of second index files include a plurality of pointers to the associated plurality of second data files, and wherein the plurality of second data files include a plurality of entries including electronic information extracted from a plurality of web-sites associated with the plurality of active domain names for keywords from the refined list of keywords;

verifying automatically that entries in the plurality of second index files are appropriate for the selected subject;

creating a final index from the plurality of entries first index; and making a vortal accessible on another network device with one or more processors via the computer network for the selected subject using the final index, wherein the final index for the vortal provides greater depth-than-breath searches for the selected subject for the vertical search engine and using the vortal from a plurality of client network devices each with one or more processors via the computer network as a vertical search engine that provides greater depth-than-breath searches for search subject selected via a client network device.

2. The method of claim 1 further comprising a computer readable medium having stored therein instructions for causing a processor to execute the steps of the method.

3. The method of claim 1 wherein the domain name system for the computer network includes the Domain Name System for the Internet.

4. The method of claim 1 wherein the plurality of entries including electronic information extracted from a plurality of web-sites associated with a plurality of active domain names from the plurality of domain name files include a title, description, a uniform resource locator, or a pre-determined amount of electronic content associated with a web-site associated with an active domain name.

5. The method of claim 1 wherein the processing step includes:

eliminating keywords that are too generic or have multiple meanings;

modifying keywords by adding alternative spellings or additional words; and adding automatically synonyms for keywords to the list of plurality of keywords to create the refined list of keywords.

6. The method of claim 1 wherein the step of opening a plurality of top-level domain name files associated with a domain name system including opening a .COM, .EDU, .GOV, .MIL, .NET or .ORG top-level domain name file associated with the Internet domain name system.

7. The method of claim 1 wherein the checking step includes attempting to visit a web-site on the computer network with a software spider to determine whether the web-site is active.

8. The method of claim 1 wherein the checking step includes extracting electronic content from an active web-site on the computer network.

9. The method of claim 1 wherein the extracting step includes:

(a) adding a first individual character component to a first file based on the first character of an entry, when the first individual character component was derived from an entry in one of the plurality of open top-level domain name files;

(b) moving the first character of the first individual character component to an end of the first individual character component, thereby exposing a next character and creating a next individual character component;

(c) adding the next individual character component to a next file based on the next character of the first individual character component;

(d) moving the next character of the next individual character component to an end of the next individual character component, thereby exposing a (next character+1) and creating a (next character+1) individual character component;

(e) adding the (next character+1) individual character component to a (next charater+1) file based on the (next character+1) of the (next character+1) individual character component;

(f) repeating steps (d) and (e) until first character of the first individual character component is reached.

10. The method of claim 1 wherein the storing step includes storing the plurality of individual character components in a plurality of separate files including one file for each letter of the English alphabet (A-Z), and the numbers zero through nine.

11. The method of claim 1 wherein the sorting step includes sorting each of the plurality of separate files based on an ASCII value of characters stored in the plurality of separate files.

12. The method of claim 1 wherein the step of creating a plurality of first index files includes:

(a) selecting a keyword from the refined list of keywords;

(b) determining whether the selected keyword comprises multiple words, and if so, (c) selecting a word with the greatest number of individual characters from the multiple words comprising the selected keyword, (d) opening a one of a plurality of sorted separate files based on a first character of the selected word from the selected keyword, wherein the plurality of sorted separate file were created by indexing a plurality of domain name files associated with a domain name system for the refined list of keywords, and (e) searching the open sorted separate file for the selected word from the selected keyword,
(f) repeating steps (c) through (e) for remaining words in the selected keyword;
and if not,
(g) opening a one of a plurality of sorted separate files based on a first character of the selected keyword, wherein the plurality of sorted separate file were created by indexing a plurality of domain name files associated with a domain name system for the refined list of keywords, and
(h) searching the open sorted separate file for the selected keyword;
(i) determining whether the selected keyword has been found in the open separate sorted, file, and if so,
(j) adding an entry to a first index file for the selected keyword;
(k) repeating steps (a), (b) and (i) for remaining keywords from the refined list of keywords.

13. A method for creating a vertical search engine, comprising:
receiving a list of a plurality of keywords to be used for the vertical search engine on a network device, wherein the list of keywords includes general and specific keywords for a selected subject;
processing the list of plurality of keywords to create a refined list of keywords, wherein the processing includes adding, subtracting or modifying automatically the list of plurality of keywords;
creating a plurality of first index files associated with a plurality of first data files by checking a plurality of domain names from a plurality of domain name files associated with a domain name system for a computer network, wherein the plurality of first index files include a plurality of pointers to the associated data files, and wherein the plurality of first data files include a plurality of entries including electronic information extracted from a plurality of web-sites associated with a plurality of active domain names from the plurality of domain name files,
wherein the plurality of domain name files include a .COM, .EDU, .GOV, .MIL, .NET and .ORG top-level domain name file associated with an Internet domain name system,
wherein the step of creating the plurality of first index files includes:
opening a plurality of top-level domain name files associated with the domain name system for the computer network;
checking a plurality of domain names from the plurality of open top-level domain name files to determine whether any of the plurality of domain names are associated with an active web-site on the computer network;
extracting domain names in the plurality of open top-level domain name files associated with active web-sites on the computer network;
storing the extracted domains names in a plurality of entries in a plurality of separate files, thereby creating a plurality of separate files including the plurality of entries; and
sorting each of the plurality of separate files based on a pre-determined sorting scheme to create a plurality of sorted separate files;
creating a plurality of second index files with associated plurality of second data files by searching the plurality of first index files for keywords from the refined list of keywords, wherein the plurality of second index files include a plurality of pointers to the associated plurality of second data files, and wherein the plurality of second data files include a plurality of entries including electronic information extracted from a plurality of web-sites associated with the plurality of active domain names for keywords from the refined list of keywords;
verifying automatically that entries in the plurality of second index files are appropriate for the selected subject;
creating a final index from the plurality of entries first index; and
making a vortal accessible on another network device via the computer network for the selected subject using the final index.

14. A method for creating a vertical search engine, comprising:
receiving a list of a plurality of keywords to be used for the vertical search engine on a network device, wherein the list of keywords includes general and specific keywords for a selected subject;
processing the list of plurality of keywords to create a refined list of keywords, wherein the processing includes adding, subtracting or modifying automatically the list of plurality of keywords;
creating a plurality of first index files associated with a plurality of first data files by checking a plurality of domain names from a plurality of domain name files associated with a domain name system for a computer network, wherein the plurality of first index files include a plurality of pointers to the associated data files, and wherein the plurality of first data files include a plurality of entries including electronic information extracted from a plurality of web-sites associated with a plurality of active domain names from the plurality of domain name files, wherein the step of creating a plurality of first index files includes:
(a) selecting a keyword from the refined list of keywords;
(b) determining whether the selected keyword comprises multiple words, and if so,
(c) selecting a word with the greatest number of individual characters from the multiple words comprising the selected keyword,
(d) opening a one of a plurality of sorted separate files based on a first character of the selected word from the selected keyword, wherein the plurality of sorted separate file were created by indexing a plurality of domain name files associated with a domain name system for the refined list of keywords, and
(e) searching the open sorted separate file for the selected word from the selected keyword,
(f) repeating steps (c) through (e) for remaining words in the selected keyword;
and if not,
(g) opening a one of a plurality of sorted separate files based on a first character of the selected keyword, wherein the plurality of sorted separate file were created by indexing a plurality of domain name files associated with a domain name system for the refined list of keywords, and
(h) searching the open sorted separate file for the selected keyword;
(i) determining whether the selected keyword has been found in the open separate sorted, file, and if so,
(j) adding an entry to a first index file for the selected keyword;
(k) repeating steps (a), (b) and (i) for remaining keywords from the refined list of keywords, wherein the plurality of domain name files include a .COM, .EDU, .GOV, .MIL, .NET or .ORG top-level domain name file associated with an Internet domain name system;

creating a plurality of second index files with associated plurality of second data files by searching the plurality of first index files for keywords from the refined list of keywords, wherein the plurality of second index files include a plurality of pointers to the associated plurality of second data files, and wherein the plurality of second data files include a plurality of entries including electronic information extracted from a plurality of websites associated with the plurality of active domain names for keywords from the refined list of keywords;

verifying automatically that entries in the plurality of second index files are appropriate for the selected subject;

creating a final index from the plurality of entries first index; and making a vortal accessible on another network device via the computer network for the selected subject using the final index, wherein the vortal provides for efficiently searching an appropriate list of keywords for the selected subject and provides greater depth-than-breath searches for the selected subject.

* * * * *